United States Patent [19]

Frame

[11] 4,419,206

[45] Dec. 6, 1983

[54] ELECTRONIC WATER TREATING DEVICE

[76] Inventor: James R. Frame, 346 Sandau Rd., San Antonio, Tex. 78216

[21] Appl. No.: 258,505

[22] Filed: Apr. 28, 1981

Related U.S. Application Data

[63] Continuation of Ser. No. 129,611, Mar. 12, 1980, abandoned, which is a continuation of Ser. No. 267, Jan. 2, 1979, abandoned.

[51] Int. Cl.³ .................. C25B 15/00; C25B 9/00; C25B 11/12; C02F 1/46
[52] U.S. Cl. ........................... 204/228; 204/149; 204/271; 204/272; 204/275; 204/294; 204/DIG. 13
[58] Field of Search ........ 204/228, 272, 294, 275–278, 204/149, DIG. 13, 271

[56] References Cited

U.S. PATENT DOCUMENTS

| | | | |
|---|---|---|---|
| 1,956,411 | 4/1934 | Bonine | 204/228 X |
| 2,299,964 | 10/1942 | Crouch | 204/272 X |
| 2,490,730 | 12/1949 | Dubilier | 204/272 X |
| 3,547,801 | 12/1970 | Paine | 204/149 X |
| 3,925,638 | 12/1975 | Scatoloni | 204/149 X |
| 4,097,355 | 6/1978 | Fischer | 204/228 |

FOREIGN PATENT DOCUMENTS

710778  6/1965  Canada ................................ 204/272

OTHER PUBLICATIONS

Journal of the American Water Works Association, vol. 36, Apr. 1944, "A New Index for Determining Amount of Calcium Carbonate Scale Formed by a Water", pp. 472–486.
Test of Hydro-Lyte Unit, Serial No. 780607-1 Jun. 1978, Lab. No. 29782, Texas Testing Laboratories, Inc.
Test of Hydrol-Lyte Unit, Serial No. 780607-1, Jul. 21-Aug. 18, 1978, Lab. No. 30463, Texas Testing Laboratories.
Welder et al., "Practical Performance of Water Conditioning Gadgets", Industrial Engineering Chemistry, vol. 46, #5, May 1954, pp. 954–960.
Eliassen et al., "Experimental Performance of 'Miracle' Water Conditioners", J. Am. Water Works Assn., Oct. 1968, pp. 1371–1385.
National Engineer, Journal of the National Association of Power Engineers, May 1975, "How Electrostatic Water Treatment Works".
Underwater Science and Technology Journal, vol. 2, No. 3, (Sep. 1970) "An Electrolytic System for Controlling Corrosion & Marine Growth", pp. 168–173.

Primary Examiner—Donald R. Valentine
Attorney, Agent, or Firm—Gale R. Peterson

[57] ABSTRACT

An electronic water treating device comprising a brass body from which projects a graphite anode and to which is secured a stainless steel canister which functions as a cathode. The device includes an electronic power head connected to an external power supply. A 115 volt AC house current is transformed into two 6.3 volt circuits. The first anode powered circuit receives 6.3 volts which is rectified through a diode bridge and powers the anode through a biased resistance. The second 6.3 volt circuit is rectified through a diode and passes through a condenser and resistance through a transistor and resister to the anode. This latter circuit is a voltage measuring circuit interconnected through a relay to a warning light which is energized and lighted if substantial variation in the current being transmitted occurs. This usually arises when an accumulation of sludge-like calcium carbonate, calcium sulphate and magnesium collects in the canister. This electronic treatment of the flow of water through a pipe conduit system reduces the formation of mineral deposits on water heaters and other devices interconnected in the conduit system in residences and industrial water supply systems. The electronic or electrolysis effect of the direct flow of current from the graphite anode to the stainless steel canister cathode disrupts the collection of calcium and magnesium particles being attracted to the coloids suspended in the water, and in its ultimate effect reduces the formation of scale in the system as well as facilitating the flushing or removal of accumulated deposits in the system.

5 Claims, 4 Drawing Figures

ELECTRONIC WATER TREATING DEVICE

CROSS REFERENCE TO RELATED APPLICATIONS

This is a continuation of application Ser. No. 129,611, filed Mar. 12, 1980, now abandoned which is a continuation of application Ser. No. 267 filed Jan. 2, 1979, now abandoned.

BACKGROUND OF THE INVENTION

1. Field of the Invention

This invention pertains to a device transmitting low voltage, low ampere, direct current from a graphite anode through a flowing water mass in a canister to stainless steel canister cathode. The flow of current affects coloids suspended in the water retarding the scale formation in water heaters, conduits or associated water system interconnected to the device.

2. Description of Prior Art

Various, previous electronic devices have been developed and used for electronic approaches to water treatment. The operability of certain previously marketed devices has been questioned. The device of this invention has been tested by a recognized laboratory having effective equipment and techniques and found to reduce scale formation in the water system. The device of this invention is believed to be an improvement over previously known art in the overall configuration of the various components. The utilization of a warning light to indicate the requirement of cleaning the residual sediments collecting in the canister and the arrangement of the various components and their general related assembly facilitating assembly and cleaning.

SUMMARY OF THE INVENTION

The device of this invention comprises a brass body or head having a threaded inlet connector and a threaded outlet connector. The body is threaded for receiving a ring or collar retaining a canister sealed by an "O" ring to the body. Mounted on and projecting into the canister from the body is an elongated graphite anode and an elongated plastic standpipe extending from an inlet port projecting parallel to the anode to the bottom or end of the stainless steel canister. Ports or apertures are constructed in the body for receiving and securing the graphite anode and the plastic standpipe. Secured also to the brass body is the electronic power head to which is connected a power cord for extension to an external power supply. The electronic power circuit receives 110 to 115 volts house current transforming it into two split 6.3 volt circuits. The anode power circuit receives a reduced voltage and rectifies it through an anode bridge and powers the anode through a biased resistance. The second 6.3 volt pickup from the transformer coil rectifies the reduced voltage through a diode bridge which, through a condenser and a resistance circuit, is connected through a transistor and a resistor to the anode. This voltage measuring circuit is interconnected through a relay to a warning light which is energized and lighted if substantial variation in the voltage or amperes being transmitted occurs. This occurs when accumulation of sludge-like water residue deposits collect on the inside of the stainless steel canister cathode. These deposits are normally soft, sludge-like collections of calcium carbonate, calcium sulphate and manganese in the water supply of this city. In the electronic treatment of a flow of water through a pipe conduit system, this device reduces the formation of mineral deposits on the water heaters or other devices interconnected in conduit system in residential and industrial water supply systems. It is believed that the electronic or electrolysis effect of the direct flow of the current from the graphite anode to the stainless steel canister cathode disrupts the collection of calcium and magnesium particles being attracted to the coloids suspended in the water and in its ultimate effect reduces the formation of scale in the system as well as facilitation of the flushing or removal of accumulated deposits in the system. Test results indicate such results as being accomplished.

BRIEF DESCRIPTION OF THE DRAWINGS

For a detailed description of the construction, assembly and operation of the device of this invention, reference is made to the attached drawings wherein identical reference characters will be utilized to refer to identical or equivalent components throughout the various views and the following detailed description of the construction of the preferred embodiment and its operation.

DESCRIPTION OF THE PREFERRED EMBODIMENT

Figures 1, 2, 3:
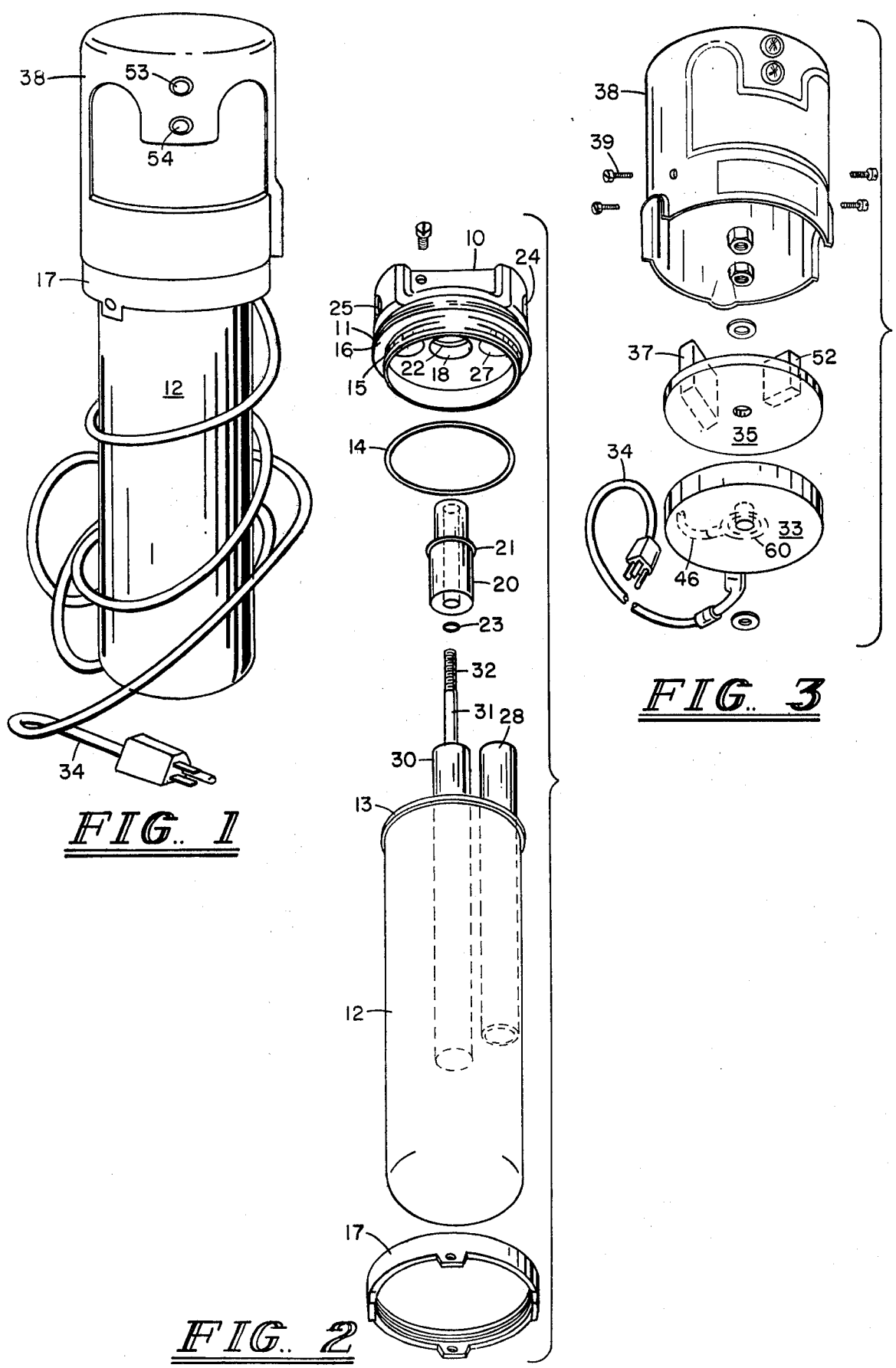
FIG. 1 is a side elevation view of the assembled device illustrating principally its outer configuration as may be interconnected in a water piping or conduit system.
FIG. 2 is a fragmented, exploded perspective illustration of the lower portion of the device of FIG. 1.
FIG. 3 is a perspective of a fragmented, exploded view of the upper portion of the device of FIG. 1 illustrating principally the general outer configuration of the power head and electronic components and the covering housing.

For a description of the construction and assembly of the preferred embodiment, particular attention is invited to FIGS. 2 and 3. The body 10, sometimes referred to as a head, is a brass casting into which are machined various portions such as threads and seats and apertures. The body 10 has an inside diameter of $3\frac{3}{8}''$ and an outside diameter of 4". Threads 11 are machined in the outer configuration to facilitate the securing of the stainless steel canister 12 which is constructed from spun stainless steel having a diameter of approximately 4" and a length of approximately 11". The canister 12 is constructed with a canister lip 13 to facilitate the connecting of the canister 12 to the body 10. Canister 12 is sealed to body 10 by means of a 4" diameter "O" ring 14 which is positioned in a body "O" ring groove 15 machined in the outer circumference of body 10. Body 10 is constructed with a body shoulder 16 against which in assembly canister lip 13 fits and abuts and is secured and retained in position by threaded ring 17 intermeshing with threads 11 of body 10. Various apertures, passageways, and mounting or securing holes are machined in body 10 as illustrated in FIG. 2. Machined through the center of body 10 is anode mounting hole 18. This anode mounting hole 18 is machined on two diameters: the entry diameter being $\frac{7}{8}''$ in diameter for receiving anode insulator 20 with a reduced diameter also of $\frac{5}{8}''$ through which the smaller diameter of anode insulator 20 projects. The point at which these two diameters meet constitutes insulator "O" ring seat 22. A small aperture is drilled through the center of anode insulator 20 for receiving the metal rod projecting from the center of the anode. In the body 10 there is constructed inlet connector 24 and on the opposite side a threaded outlet connector 25. These two connectors 24 and 25 are provided for attaching of pipes (not shown) to the water supply flowing through the device. The aperture on the inlet side of body 10 communicating with inlet connector 24 is inlet port 27 to which is attached a plastic standpipe 28 which, in the preferred embodiment, was 8" section, ¾" polyvinyl chloride pipe. The anode 30, as illustrated in FIG. 2, was constructed of graphite, and is 8" long having a diameter of ⅞" from the center of which projected a threaded anode retaining rod 31 having a general configuration as illustrated in FIG. 2. This retaining rod 31 in the assembly of the device projects through the center of anode insulator 20 and upon assembly, seals against anode rod "O" ring 23. The threaded portion 32 of anode retaining rod 31 facilitates the electrical attachment of the anode to the power package as well as the general assembly of the device and the retention of the components; the anode 30, the anode insulator 20, and the power head case 33 to the body 10. Power head case 33 was a plastic dishlike structure having an aperture for receiving anode retaining rod 31. This power head case 33 is approximately 4" in diameter and had a depth of approximately 1". Connected to the power head case 33 is power cord 34. The ultimate assembly of the device power head case 33 would be filled with epoxy for receiving electronic components projecting from printed circuit board 35. On the outside of printed circuit board 35 was mounted power transformer 37 which could be a Triad F-195XP having an output of 6.3 volts at 1.2 amps and a relay 53.

Figure 4:
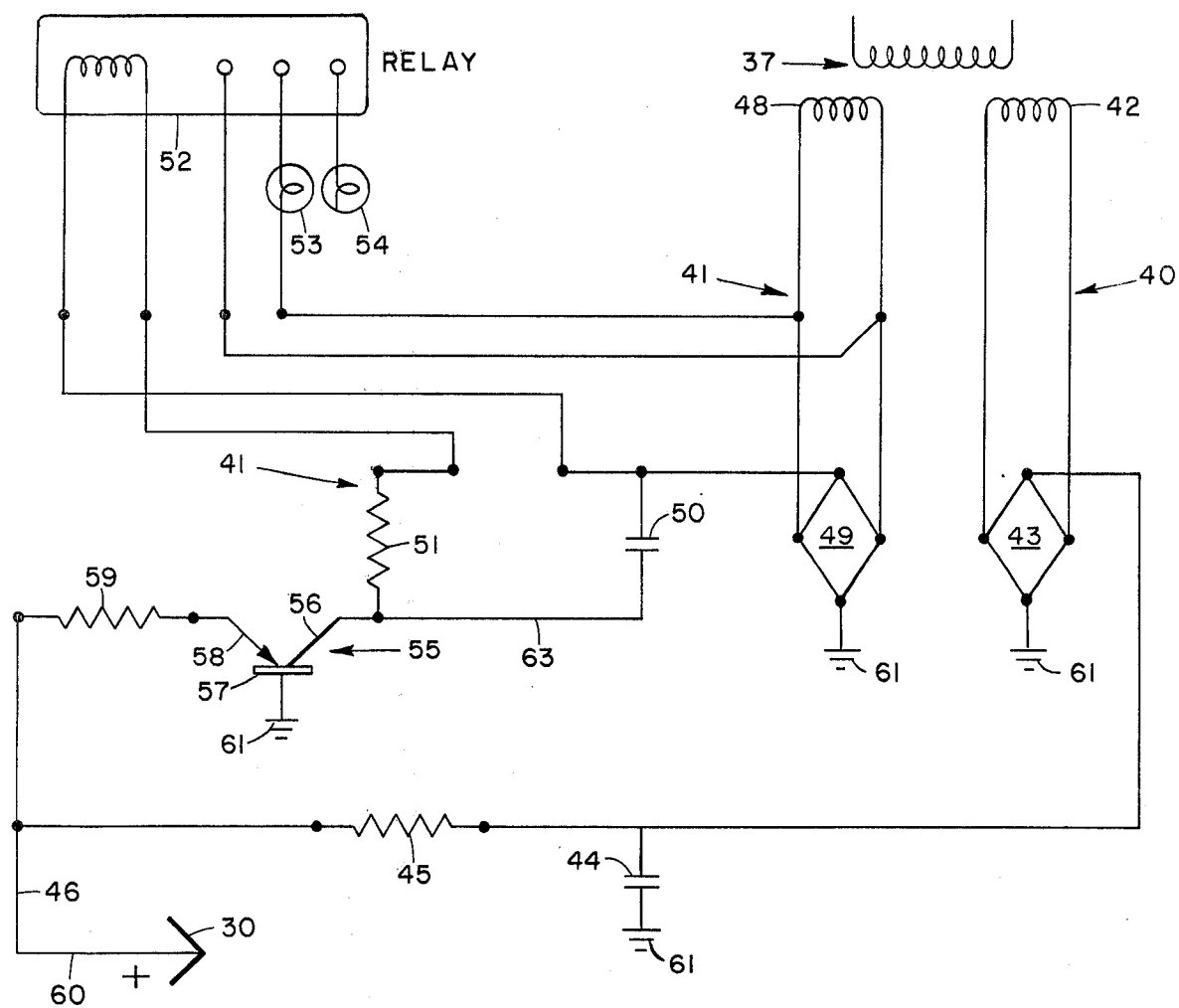
FIG. 4 is a schematic wiring diagram of the electrical and electronic components comprising the power head.

The general assembly and intermeshing of the various components are illustrated in the perspective and exploded views of FIGS. 2 and 3 with the final assembly being illustrated in FIG. 1. For an illustration of the general configuration and construction of the power supply of this device, reference is made to the electronic schematic drawing shown in FIG. 4.

A standard household voltage of 115 volts AC is fed into the primary winding 70 of transformer 37. The transformer 37 has two secondary windings 42 and 48 which generate approximately 6.3 volts AC. While the ratings may vary, transformer 37 is typically rated for 1.2 amps maximum. Secondary winding 42 is connected across diode bridge 43 to give a full rectified wave form, which full rectified wave form is subsequently filtered to a DC voltage by a filter capacitor 44. A typical such filter capacitor 44 may be approximately 250 microfarads and rated at ±12 volts. In parallel with the filter capacitor 44 (which is connected across the diode bridge 43) is a series connection of resistor 45 and the anode 30. Anode 30 will have a resistance that varies depending upon the amount of cumulation of deposits thereon. Therefore, the anode 30 and the resistor 45 form a voltage divider network with the voltage at connection 46 increasing as the resistance of anode 30 increases due to increased deposits. Once a sufficient accumulation occurs on anode 30, the voltage at connection 46 will cause a current to flow through biasing resistor 59 and into transistor 55. As the current through biasing resistor 59 increases to a predetermined level, a sufficient bias voltage is developed across the emitter 48 to base 57 junction of transistor 55 to trigger transistor 55 into conduction. Thereafter, the major current will flow from collector 56 with the resistance to current flow through transistor decreasing from a very high value to a very low value.

Filtering capacitor 50 is connected across diode bridge 49 to give essentially a DC voltage from a full rectified wave form received from the diode bridge 49. Connected in parallel with the filter capacitor 50 is a coil 71 of relay 52. Current flow through coil 71, current limiting resistor 51, and transistor 55 will energize the relay 52. Energization of the relay 52 will cause normally open contact 69 to close and normally closed contact 68 to open. Connected in series with normally closed contact 68 is a green light 54. Both the normally open contact 69 and the normally closed contact 68 connect to one side of the secondary winding 48. Upon applying 115 volts AC to the transformer 37, the green light 54 will be energized. However, upon accumulation of a sufficient amount of material on anode 30 to cause conduction of transistor 55 and energization of relay 52, the green light 54 will go out with the opening of normally closed contact 68, and red light 53 will be energized by the closing of normally open contact 69. Once the red light 53 comes on, it signals that the anode 30 should be cleaned.

OPERATION OF THE DEVICE

In the operation of the device of this system, the inlet connector 24 is attached to the external pressure water supply (not illustrated). The outlet connector 25 is connected to water heater or house water supply (not illustrated). The power cord 34 is attached to 115 volt AC conventional house current. The device, in its configuration as illustrated and described, operates without any further external assistance. The lighting of power light 53 indicates the system is receiving power. The absence of the lighting of warning light 54 indicates the system is operating satisfactorily. The voltage measuring circuit 41 as described operated satisfactorily with the municipal water supply of the City of San Antonio. Modified circuitry may be required for water supplies in other areas.

To illustrate the operation of the device of this invention and its effect on water, tests were conducted closely associated with the incrustation test procedures and equipment employed and developed by Mr. John W. Ryznar as set forth in his article entitled, "The New Index for Determining Amount of Calcium Carbonate Scale Formed by Water" published in Volume 36 of the *Journal of American Water Works Association*. The test method was designed to determine the effectiveness of this device in removing heavy mineral incrustation and what effect its use would have to prevent incrustation from a calcium carbonate water. The results of these tests are summarized as follows:

The first test was conducted to determine the effectiveness of the device of this invention in removing calcium incrustation deposited in a water system. For the purpose of incrusting glass coil, water having a high calcium carbonate and calcium sulphate mix was employed. Tabulation of the characteristics of the water is as follows:

| | |
|---|---|
| pH | 7.60 |
| Conductivity, micromhos/cm | 750 |
| | MG/L |
| Calcium (Ca) | 108 |
| Magnesium (Mg) | 18 |
| Total Iron (Fe) | 0.04 |
| Total Alkalinity as $CaCO_3$ | 194 |

-continued

| | |
|---|---|
| Total Hardness as CaCO3 | 380 |
| Chloride (l) | 25 |
| Sulfate (SO4) | 188 |
| Total Solids | 518 |

Notes:
Flowed 54 liters at 190 deg. F. Period 6-7-78 to 6-9-78. Incrustation 615 milligrams.

The device of this invention was connected to the glass coil. The device was activated and water flowed through the device. The relative content of the water flowing into the device and out of the coil indicate that the electronically treated water caused the removal of deposits from the glass coil. The results of these tests were as follows:

ANALYSIS OF WATER USED TO REMOVE INCRUSTATION

Water Type: Calcium carbonate (San Antonio City Water)
Hydro-Lyte Status: Engaged with power on
Test Purpose: Test water "in" and "out" of Hydro-Lyte with power on but without coil in place.
Water Volume: 5 liters, room temperature (28° C.)
Test Date: June 12, 1978

| | Water In | Water Out |
|---|---|---|
| pH | 8.0 | 7.9 |
| Conductivity, micromhos/cm | 450 | 480 |
| | mg/l | mg/l |
| Calcium (Ca) | 61 | 62 |
| Magnesium (Mg) | 19 | 19 |
| Total Iron (Fe) | 0.04 | 0.04 |
| Total Alkalinity as CaCO3 | 182 | 200 |
| Total Hardness as CaCO3 | 228 | 236 |
| Chloride (Cl) | 24 | 23 |
| Sulfate (SO4) | 23 | 23 |
| Total Solids | 333 | 352 |

Notes:
Flowed 72 gallons at 190 deg. F. Flow period 6-12-78 to 6-15-78. Residual stain (iron) was 2 milligrams. Removed 613 milligrams of incrustation. Incrustation removal 99.7 percent. Not removed (iron stain) 0.3 percent.

Immediately upon the removal of the 613 milligrams of incrustation and the residual measurement, flow was continued with City Water with increases in rust deposition. A total of 315 gallons was the flowed at 190 deg. F. with an increase of stain. Test period June 20, 1978 to June 26, 1978. Test was discontinued on June 26, 1978. Additional stain was 0.2 milligrams of rust.

The second phase of the test conducted on the device utilized City Water with the water flowing into the system with the inflowing water having a mineral content determined to be as follows:

WATER ANALYSIS TO SHOW EFFLUENT CHANGES

Water Type: Calcium carbonate (San Antonio City Water)
Hydro-Lyte Status: Engaged with power on
Test Purpose: To compare mineral composition of water after passing through Hydro-Lyte and stripped glass coil to determine if any changes in mineral composition occur, or, if coil is coated.
Water Volume: Flow rate, 3 gallons per hour at 180 deg. F.
Test Date: Started at 8:00 a.m., June 15, 1978

| | Water In |
|---|---|
| pH | 8.20 |
| | MG/L |
| Calcium (Ca) | 65 |
| Magnesium (Mg) | 21 |
| Total Iron (Fe) | 0.04 |
| Total Alkalinity as CaCO3 | 198 |
| Total Hardness as CaCO3 | 252 |
| Chloride (Cl) | 24 |
| Sulfate (SO4) | 26 |
| Total Solids | 264 |
| Conductivity, micromhos/cm | 470 |

The flow rate was three gallons per hour at 180° Fahrenheit. It started at 8:00 a.m. The water flow from the system at 8:00 a.m. at the discharge from the device had the following mineral content:

| | Water Out 6-15-78 Sample at 8:00 a.m. |
|---|---|
| pH | 7.50 |
| | MG/L |
| Calcium (Ca) | 43 |
| Magnesium (Mg) | 12 |
| Total Iron (Fe) | 2.05 |
| Total Alkalinity as CaCO3 | 130 |
| Total Hardness as CaCO3 | 160 |
| Chloride (Cl) | 24 |
| Sulfate (SO4) | 24 |
| Total Solids | 228 |
| Conductivity, micromhos/cm | 370 |

The mineral content of the water from a sample taken at 3:00 p.m. was indicated as follows after a flow of 21 gallons:

| | Water Out 6-15-78 Sample at 3:00 p.m. |
|---|---|
| pH | 8.30 |
| | MG/L |
| Calcium (Ca) | 59 |
| Magnesium (Mg) | 15 |
| Total Iron (Fe) | 0.25 |
| Total Alkalinity as CaCO3 | 184 |
| Total Hardness as CaCO3 | 208 |
| Chloride (Cl) | 24 |
| Sulfate (SO4) | 24 |
| Total Solids | 264 |
| Conductivity, micromhos/cm | 450 |

The water was shut in to the device for 63½ hours and a sample withdrawn. Sample of the water out on June 19, 1978, was analyzed with the following mineral content:

| | Water Out 6-19-78 Sample at 8:30 a.m. |
|---|---|
| pH | 6.70 |
| | MG/L |
| Calcium (Ca) | 14 |
| Magnesium (Mg) | 4 |
| Total Iron (Fe) | 30 |
| Total Alkalinity as CaCO3 | 30 |
| Total Hardness as CaCO3 | 50 |
| Chloride (Cl) | 17 |
| Sulfate (SO4) | 22 |
| Total Solids | 240 |
| Conductivity, micromhos/cm | 150 |

The test results would indicate the device to have a beneficial effect in removing incrustations from a water system as well as in a shut-in configuration removing substantial quantities of calcium incrustation forming combinations from the water.

The purpose of this device is not intended to be to remove anything from the water or to add anything to the water. The contention of your applicant is that water treated with this device is less apt to form the calcium incrustation deposits on a water system supplied with water through the device.

Having described the construction and operation of the device, what is desired to be claimed is all modification and equivalents not departing from the scope of equivalents of this invention as described and as claimed in the appended claims.

I claim:

1. A water treating device comprising:
   a body portion having water inlet and outlet aperture means formed therein;
   an anode removeably secured through electrical insulator means to said body portion;
   cannister cathode means removeably secured to said body portion such that the interior of said cannister cathode is in fluid communication with said inlet and outlet aperatures and said anode is centrally disposed in said cannister cathode;
   circuit means electrically connected to said anode and said cannister cathode for providing a flow of direct current through said anode and cannister cathode and through water flowing through said cannister cathode; and
   a standpipe in fluid communication with said water inlet aperture and projecting away from said body portion adjacent said anode, whereby water entering said cannister cathode is introduced at the base thereof.

2. A water treating device as in claim 1 wherein said circuit means comprises:
   first circuit means for providing a flow of direct current through said anode and said canister cathode and through water flowing through said canister cathode; and
   second circuit means for providing an indication that the resistence of said anode has increased beyond a predetermined value due to an accumulation of material deposits thereon.

3. A water treating device as in claim 1 wherein said first circuit means comprises:
   transformer means for providing a low voltage alternating current;
   diode bridge means electrically connected to said transformer means and to said anode and said canister cathode for providing a flow of direct current between said anode and said canister cathode.

4. A water treatment device as in claim 3 wherein said second circuit means comprises:
   first indicator means electrically connected to said transformer means for indicating the application of power to said water treatment device;
   second indicator means for indicating the resistance of said anode means has exceded a pre-determined value;
   sensing means electrically connected to said anode for sensing when the resistance of said anode excedes a pre-determined value;
   switch means electrically connected to said anode, said sensing means, and said second indicator means and operable to activate said second indicator means when the resistence of said anode excedes a pre-determined value.

5. A water treatment device as in claim 1 wherein said anode comprises a graphite anode.

* * * * *